United States Patent
Basile et al.

(10) Patent No.: US 10,495,194 B2
(45) Date of Patent: Dec. 3, 2019

(54) ADJUSTABLE BRACKET TO ADJUST FRONT END ACCESSORY DRIVE FOR USE WITH STRETCH FIT BELT

(71) Applicant: Ford Global Technologies, LLC, Dearborn, MI (US)

(72) Inventors: James M. Basile, Dundee, MI (US); Scott Willis, Gibraltar, MI (US); Joseph Alan Skrobowski, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 289 days.

(21) Appl. No.: 15/587,337

(22) Filed: May 4, 2017

(65) Prior Publication Data

US 2018/0320763 A1    Nov. 8, 2018

(51) Int. Cl.
 *F16H 7/12* (2006.01)
 *F16H 7/08* (2006.01)
 *F02B 67/06* (2006.01)

(52) U.S. Cl.
 CPC ........... *F16H 7/129* (2013.01); *F16H 7/0848* (2013.01); *F02B 67/06* (2013.01); *F16H 2007/088* (2013.01); *F16H 2007/0842* (2013.01); *F16H 2007/0865* (2013.01); *F16H 2007/0893* (2013.01)

(58) Field of Classification Search
 CPC ................... F16H 7/129; F16H 7/0848; F16H 2007/0842; F16H 2007/088; F16H 2007/0893; F16H 2007/0865; F02B 67/06
 USPC ........................................................ 474/133
 See application file for complete search history.

(56) References Cited

U.S. PATENT DOCUMENTS

| | | | | |
|---|---|---|---|---|
| 4,023,428 A | * | 5/1977 | Dysard | F16H 7/10 474/113 |
| 4,571,223 A | * | 2/1986 | Molloy | F16H 7/1281 474/112 |
| 5,244,438 A | * | 9/1993 | Golovatai-Schmidt | F01L 1/02 474/112 |
| 5,256,113 A | | 10/1993 | Bushman et al. | |
| 5,820,503 A | * | 10/1998 | Bruchner | F16H 7/1281 474/112 |
| 5,957,795 A | * | 9/1999 | Hawes | F16H 7/1281 474/101 |
| 6,149,542 A | * | 11/2000 | Lehtovaara | F16H 7/12 29/888.01 |

(Continued)

*Primary Examiner* — Michael R Mansen
*Assistant Examiner* — Mark K Buse (57) ABSTRACT

The disclosed inventive concept provides an adjustable and lockable bracket assembly that allows a stretch fit belt to be installed loosely on the pulleys of an accessory drive system. The assembly includes a fixed bracket attached to the engine, a pivoting and lockable bracket attached to the fixed bracket and an adjustable driven unit, an adjustable arm for moving the adjustable driven unit between a "belt install" position allowing attachment of the belt and a "final" position for stretching the attached belt, and a rotatable insert having an offset threaded hole with a threaded fastener attached to the adjustable arm for moving the driven unit between the "belt install" and "final" positions. In the "belt install" position, the stretch fit belt may be fitted over the FEAD pulleys. Once in position, the rotatable insert is rotated to move the driven unit to the "final" position again via the adjustable arm.

20 Claims, 7 Drawing Sheets

(56) References Cited

U.S. PATENT DOCUMENTS

| | | |
|---|---|---|
| 8,527,142 B2 | 9/2013 | Bacon |
| 9,297,445 B2 | 3/2016 | Kees et al. |
| 2003/0176250 A1 | 9/2003 | Austin et al. |
| 2004/0009837 A1* | 1/2004 | Serkh ................. F16C 13/006 474/135 |
| 2006/0217221 A1* | 9/2006 | Hansen .................... F16H 7/14 474/101 |
| 2008/0139353 A1* | 6/2008 | Stepniak ............... F16H 7/1281 474/112 |
| 2008/0234083 A1* | 9/2008 | Haenbeukers ........ F16H 7/1281 474/135 |
| 2008/0268994 A1* | 10/2008 | Bushnell ................. B62K 19/34 474/112 |
| 2009/0124443 A1* | 5/2009 | Stief ........................ F16H 7/14 474/167 |
| 2011/0312454 A1* | 12/2011 | Comsa .................... F01L 1/02 474/110 |
| 2013/0165284 A1* | 6/2013 | Mennerat ............. F16H 7/1281 474/112 |
| 2014/0238320 A1 | 8/2014 | Stade et al. |

* cited by examiner

FIG-10

ADJUSTABLE BRACKET TO ADJUST FRONT END ACCESSORY DRIVE FOR USE WITH STRETCH FIT BELT

TECHNICAL FIELD

The disclosed inventive concept relates generally to pulley systems for vehicle engines. More particularly, the disclosed inventive concept relates to an adjustable bracket system fitted to a belt-driven component for use with a low modulus or stretch fit drive belt. The adjustable bracket system utilizes a rotatable insert having an offset fastener and an adjustable locking bracket arrangement.

BACKGROUND OF THE INVENTION

The modern internal combustion engine usually incorporates a pulley drive system for powering accessories driven by the engine crankshaft. The accessories typically include an air conditioning compressor, a power steering pump, a water pump, and an alternator. Such accessories make up the front end accessory drive system (or "FEAD system"). Each of the accessories requires a driven pulley.

A front end accessory drive belt is trained around pulleys to supply power from the crankshaft of the engine to the accessories. The drive belt makes frictional contact with the face of the pulleys. Drive belts developed from the flat leather belt to V-belts and more recently to multi-V or serpentine belts. Most drive belts used today are formed from a flexible reinforced polymeric material.

However, to reduce both production cost and packaging, automobile manufacturers have more recently adopted low modulus or stretch fit belts that, unlike the widely-used multi-V or serpentine belts, have an effective degree of elasticity because of reinforcing cords made from polyamide material. The reinforcing cords of the most prevalent serpentine belt used today incorporate relatively inelastic aramid or polyester cords. The modern stretch fit belt is thus finding increased usage on FEAD systems to transmit torque from the engine crankshaft to one or more engine mounted accessories as is the case with traditional belts.

Stretch fit belt systems have a cost and package advantage over standard FEAD system belts that require and automatic spring loaded belt tensioner. No tensioning is required for stretch fit belts as these belts are self-tensioning. While having the appearance of conventional serpentine belts, stretch fit belts generally cannot be used on vehicles designed for use with standard drive belts. However, in some cases, it is possible to use a stretch fit belt on vehicles designed for use with conventional serpentine belts. This requires removal of the automatic tensioner and potentially some re-routing of the belt path.

The disadvantage of stretch fit belts is in the area of installation and service. The length of the stretch fit belt is actually less than the actual working length. However, when installed, the stretch fit belt is automatically tensioned. Installation is difficult because of assembly plant cycle time and the fact that the stretch fit belt has to be stretched over the pulley flanges for installation. This requires specialized tools that take up manufacturing line space and can also slow down cycle time. Belts are often cut off in service, creating additional cost for the customer, as a new belt is required even if the stretch fit belt is not the reason for the vehicle service.

As in so many areas of vehicle technology there is always room for improvements related to the design of a system for use with the modern stretch fit belt. Particularly, it would be advantageous to provide a modified FEAD system that can be readily adapted for use with a stretch fit belt without the need for specialized tools.

SUMMARY OF THE INVENTION

The disclosed inventive concept overcomes the problems of known FEAD systems for engines that utilize low modulus or stretch fit drive belts by providing an adjustable and lockable bracket assembly that allows the stretch drive belt to be installed loosely on the pulleys of the accessory drive system and then subsequently tightened by adjustment and tightening of the assembly. The bracket assembly includes a fixed bracket that is attached to the engine, a pivoting and lockable bracket attached to the fixed bracket and to an adjustable driven unit, an adjustable arm for moving the adjustable driven unit between a "belt install" position that allows for attachment of the stretch fit belt and a "final" position for stretching the attached belt, and a rotatable insert having an offset threaded hole into which a fastener is threadably inserted attached to the adjustable arm for moving the driven unit between the "belt install" and "final" positions.

When the rotatable insert is rotated to move the driven unit to the "belt install" position via the adjustable arm, the stretch fit belt may be fitted over the pulleys of the FEAD system including over the pulley of the driven unit. Once in position, the rotatable insert is rotated to move the driven unit to the "final" position again via the adjustable arm, thereby taking up the slack in the belt and putting it in tension for proper operation. The rotatable insert may be rotated using a conventional tool, thus avoiding the need for specialized tooling.

Once the rotatable insert is rotated so that the driven unit is in its "final" position, the pivoting and lockable bracket attached to the fixed bracket and the fastener attached to the rotatable insert are mechanically locked against movement. In the event that the engine requires service that necessitates the removal of the stretch drive belt, steps for removal of the belt are opposite those required to install the belt. Specifically, the fasteners of the pivoting bracket are loosened, the rotatable insert is rotated to release the tension on the belt, and the belt is removed without damage and re-used if necessary.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described for different constructed embodiments. These specific parameters and components are included as examples and are not meant to be limiting.

In general, the disclosed inventive concept provides a practical and cost-effective approach to a pulley system that allows for simplified installation of a stretch fit belt without the need for specialized tooling. The system of the disclosed inventive concept allows the installer to (1) loosen fasteners on a movable bracket associated with the driven accessory using a conventional tool, (2) place the stretch fit belt on the pulleys of the FEAD system in its initial or "belt install" position, (3) rotate the rotatable element of an adjustment assembly using a conventional tool until the driven accessory is moved to its "final" position in which the belt is rendered taught, and (4) tighten the fasteners on the movable bracket and on the rotatable insert.

The arrangement of the disclosed inventive concept is illustrated in the accompanying figures and is illustrated in various stages in the figures. Particularly, in FIGS. 1 through 4, the bracket assembly is illustrated in its "belt install" position. The bracket assembly is illustrated in its "intermediate" position in FIGS. 5 through 7. And the bracket assembly is illustrated in its "final" position in FIGS. 8 through 10. It is to be understood that the precise configurations shown in the figures are not intended as being limiting, as variations such as shape, position and size can be anticipated without deviating from either the spirit or the scope of the disclosed inventive concept.

Figure 1:
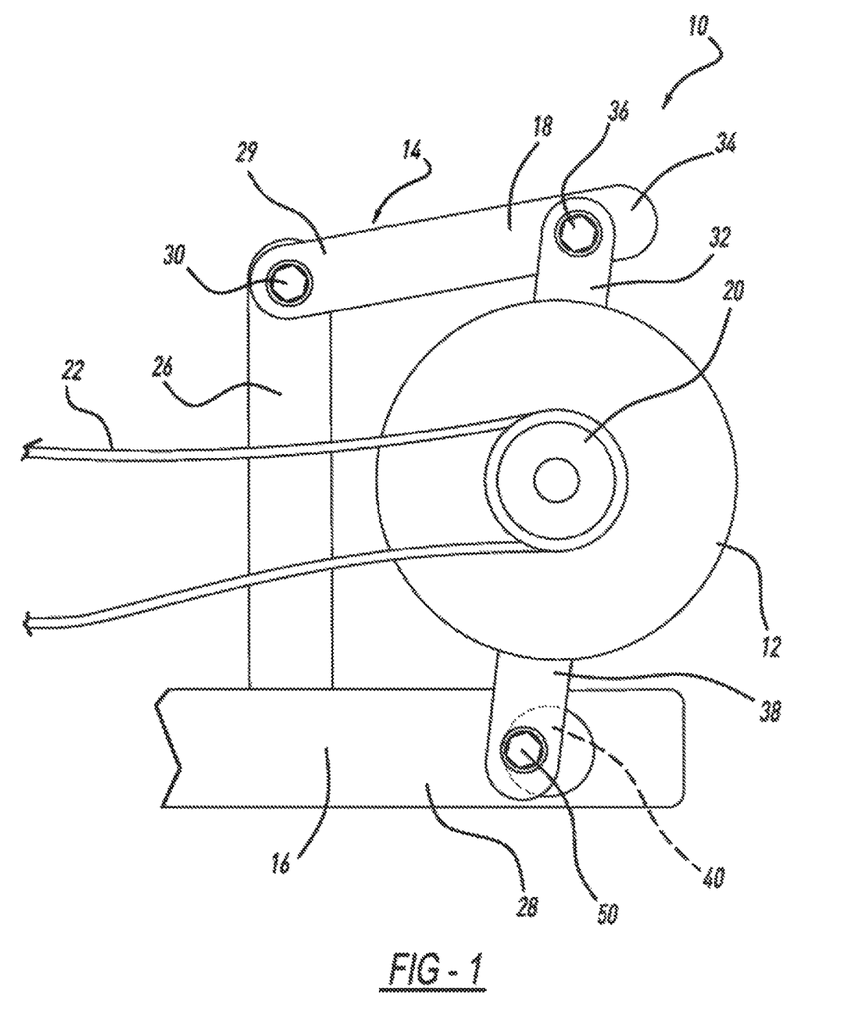
FIG. 1 is a side view of a stretch fit belt bracket assembly according to the disclosed inventive concept wherein the driven unit is positioned in a "belt install" position to allow for belt attachment.

With reference to FIG. 1, a side view of a stretch fit belt bracket assembly according to the disclosed inventive concept is illustrated. The stretch fit belt bracket, generally illustrated as 10, is shown in its "belt install" position. This position allows for belt attachment. The stretch fit belt bracket assembly 10 includes a driven accessory 12. The driven accessory 12 may be of any number of such accessories including, without limitation, an air conditioning compressor, a power steering pump, a water pump, and an alternator. The stretch fit belt bracket assembly 10 further includes a bracket structure 14 having a fixed bracket 16 and a movable bracket 18. The fixed bracket 16 is fixedly attached to a strategic location on the engine (not shown). The movable bracket 18 is pivotably attached to the upper end of the fixed bracket 16.

The driven accessory 12 includes an accessory pulley 20. The accessory pulley 20 provides an attachment surface for a low modulus or stretch fit drive belt 22. As illustrated in FIG. 1, the stretch fit drive belt 22 is loosely installed when the stretch fit belt bracket assembly 10 is in the "belt install" position. Movement of the stretch fit belt bracket assembly 10 beyond the "belt install" position to tighten the stretch fit drive belt 22 is made possible by movable components of the bracket structure 14. These components include the movable bracket 18 pivotably attached to a fixed support bracket 26 that itself is fixedly attached to a base bracket 28. The movable bracket 18 includes a first end 29 that is releasably attached to the fixed support bracket 26 by an adjustable fastener 30. While illustrated as being separate components, it is to be understood that the bracket 26 and the bracket 28 may be a single, integral part. It should be understood that the fixed bracket 16 refers to the support bracket 26 and the base bracket 28 as a whole.

One end of an accessory arm 32 is fixedly attached to the driven accessory 12. The other end of the accessory arm 32 is attached to a second end 34 of the movable bracket 18. The accessory arm 32 is releasably attached to the movable bracket 18 by an adjustable fastener 36.

One end of a movable arm 38 is fixedly attached to the accessory 12 and the other end of the movable arm 38 and movably attached at one end to a rotatable adjustment assembly 40 (partially illustrated in broken lines in FIG. 1). The rotatable adjustment assembly 40 is rotatably mounted in the base bracket 28 as explained below.

Figure 2:
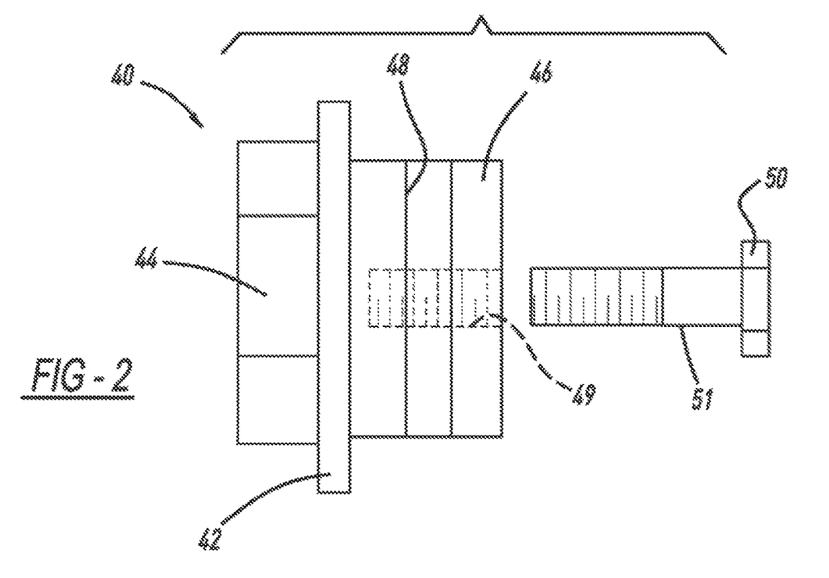
FIG. 2 is a side view of a rotatable insert for use in the bracket assembly.
Figure 3:
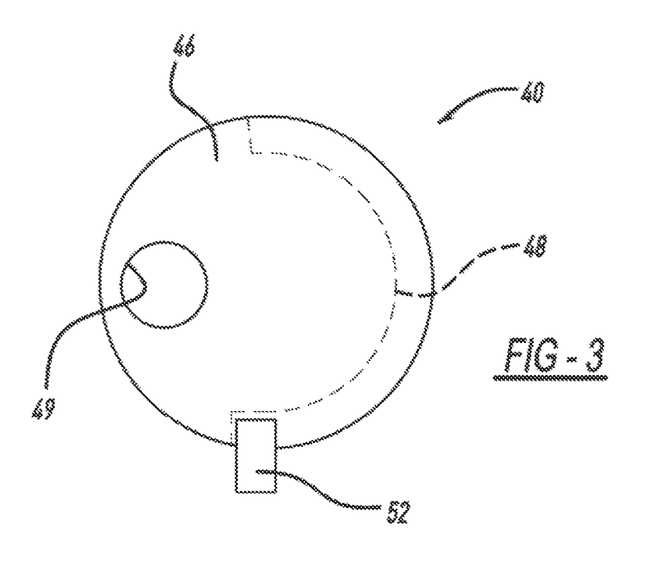
FIG. 3 is an end view of the rotatable insert of FIG. 2 in which the insert is rotated to its "belt install" position.

The rotatable adjustment assembly 40 is illustrated in isolation in FIGS. 2 and 3. With reference to these figures, the rotatable adjustment assembly 40 includes a support flange 42. On one side of the support flange 42 is a tool fitting 44 adapted for use with a conventional tool such as a socket wrench. On the other side of the support flange 42 is a rotatable cylinder body 46. Formed around a portion of the circumference of the rotatable cylinder body 46 is a stop pin channel 48. Formed in the back side of the rotatable cylinder body 46 is an offset threaded hole 49 into which a threaded fastener or bolt 50 is fitted. The threaded fastener 50 includes a shoulder 51.

Figure 4:
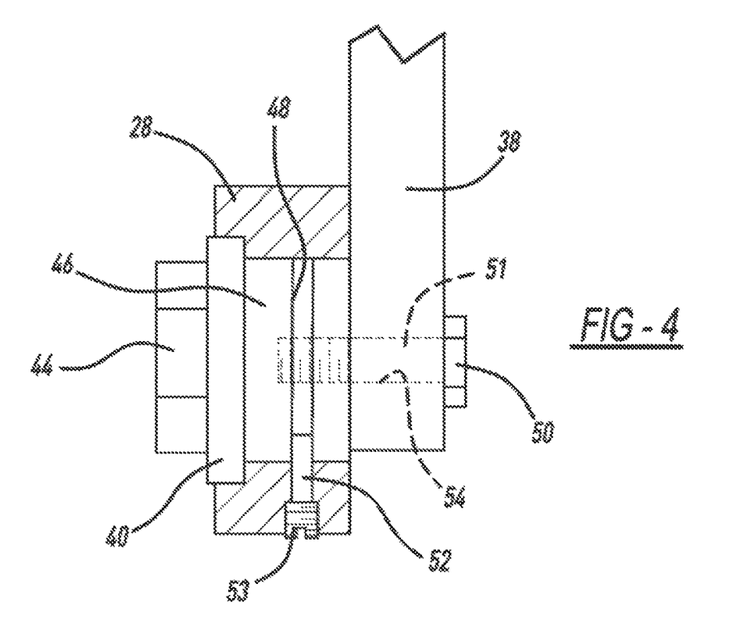
FIG. 4 is a side view of a portion of the bracket assembly of the disclosed inventive concept showing the rotatable insert in place within a fixed bracket and in conjunction with a movable arm fixed to the driven unit in which the rotatable insert is moved so that the driven unit is in the "belt install" position.

As illustrated in FIG. 3 portion of a stop pin 52 is positioned within the stop pin channel 48. As illustrated in FIG. 4, the stop pin 52 is fixedly embedded in the base bracket 28 and is retained in the illustrated operative position by a threaded plug 53. The rotatable cylinder body 46 and a portion of the support flange 42 are rotatably mounted in the base bracket 28. Also as shown in FIG. 4, the shoulder 51 of the fastener 50 is rotatably mounted in an aperture 54 formed in the movable arm 38.

Figure 5:
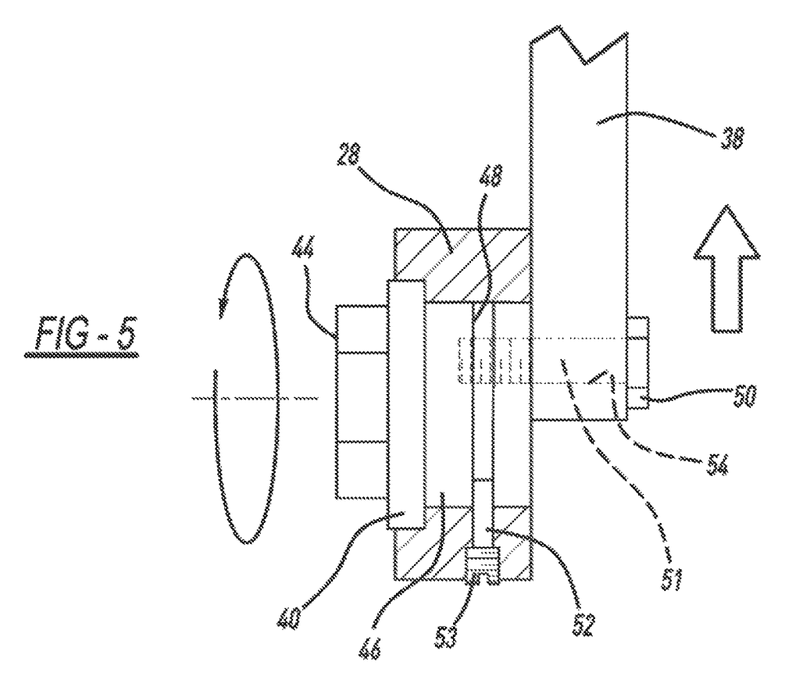
FIG. 5 is a view similar to that of FIG. 4 but showing the rotatable insert moved so that the driven unit is in the "intermediate" position.
Figure 6:
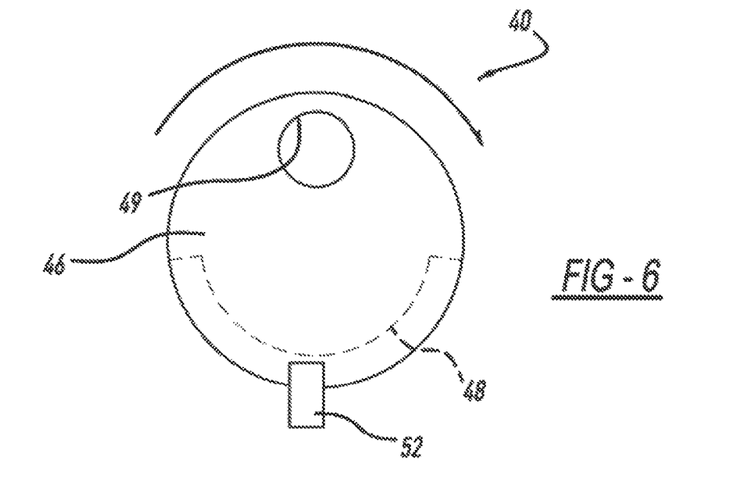
FIG. 6 is an end view of the rotatable insert of FIG. 2 in which the insert is rotated to its "intermediate" position.
Figure 7:
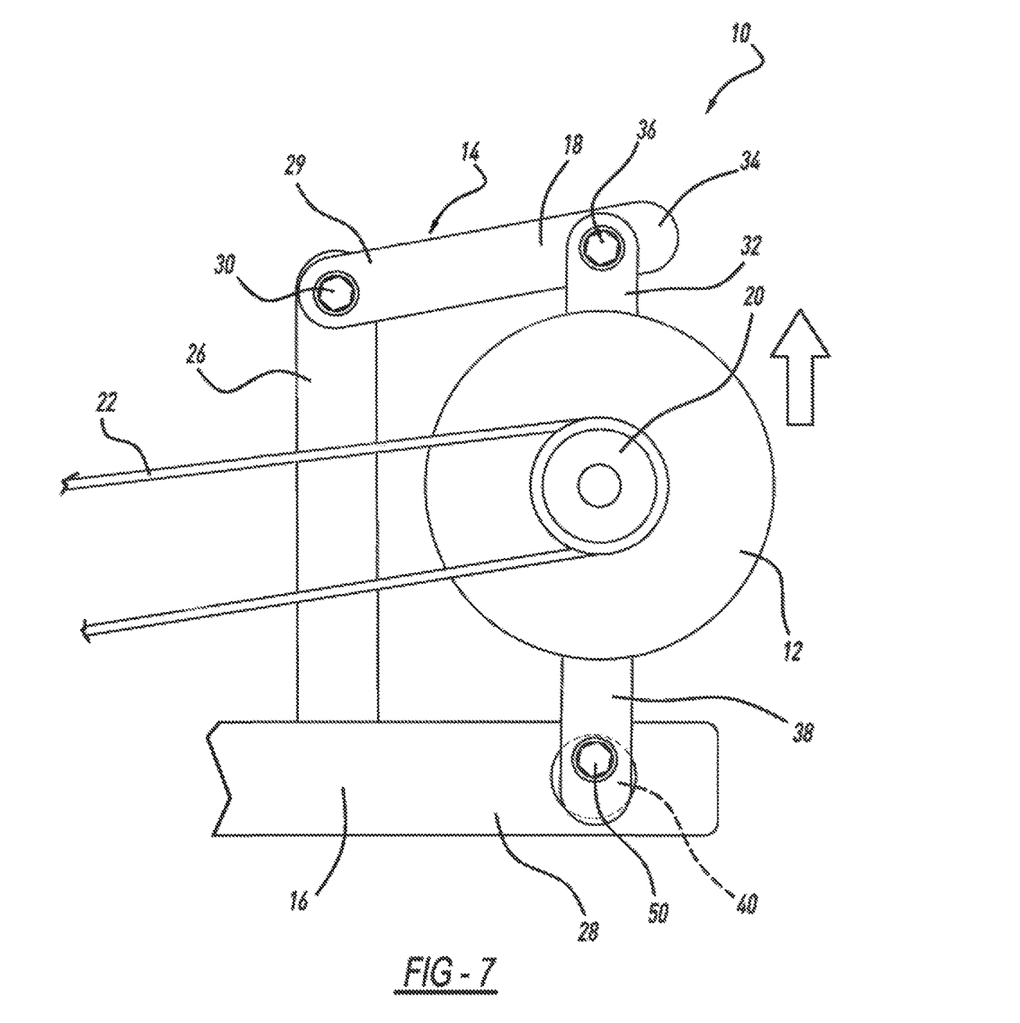
FIG. 7 is a side view of a stretch fit belt bracket assembly according to the disclosed inventive concept wherein the driven unit is positioned in its "intermediate" position.

Once the stretch fit drive belt 22 has been loosely fitted over the pulley 20 of the driven unit 12, adjustment of the driven unit 12 can be undertaken. FIGS. 5 through 7 illustrate the intermediate stage of adjustment of the stretch fit belt bracket assembly 10 in which an increased amount of tension has been applied to the stretch fit drive belt 22. As shown in FIGS. 5 and 6, the rotatable cylinder body 46 of the rotatable adjustment assembly 40 has been rotated as indicated by, for example, a socket wrench attached to the tool fitting 44. This rotation causes the movable arm 38 to be moved as well. Movement of the movable arm 38 causes movement of the driven unit 12.

Continued rotation of the rotatable cylinder body 46 results in movement of the stretch fit belt bracket assembly 10 to its "final" position in which the stretch fit drive belt 22 has been fully elongated to its operating condition. This aspect of the disclosed inventive concept is illustrated in FIGS. 8 through 10.

Figure 8:
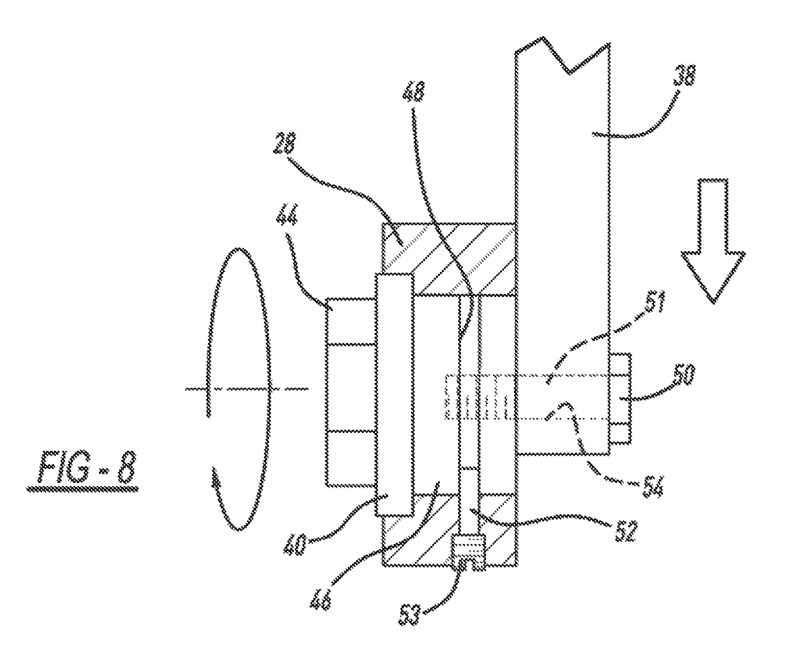
FIG. 8 is a view similar to that of FIG. 4 but showing the rotatable insert moved so that the driven unit is in the "final" position.
Figure 9:
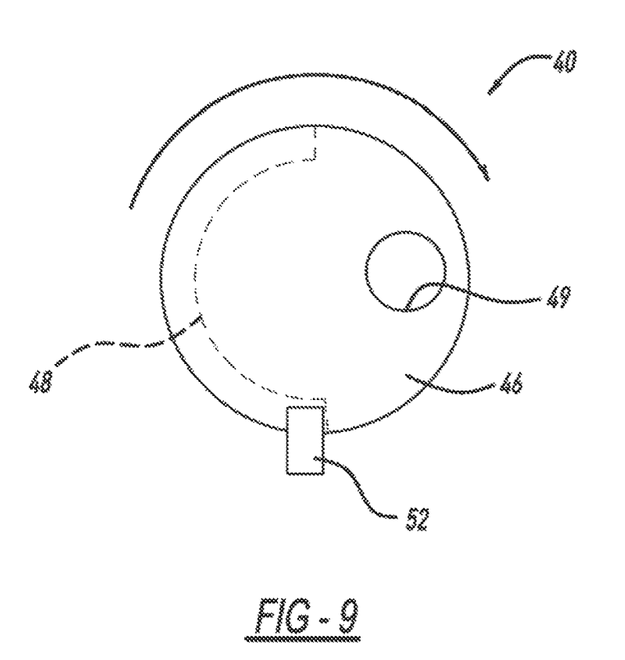
FIG. 9 is an end view of the rotatable insert of FIG. 2 in which the insert is rotated to its "final" position.

As shown particularly in FIG. 8, the rotatable cylinder body 46 of the rotatable adjustment assembly 40 has been rotated as indicated by, again for example, a socket wrench attached to the tool fitting 44. Movement of the rotatable adjustmentassembly 40 by the installer is continued until the stop pin 52 comes into contact with an end wall of the stop pin channel 48 as illustrated in FIG. 9. This same rotation causes the movable arm 38 to be moved to its extreme position, which in turn pushes the driven unit 12 to a position whereby the stretch fit drive belt 22 is stretched to its maximum condition as illustrated in FIG. 10.

Figure 10:
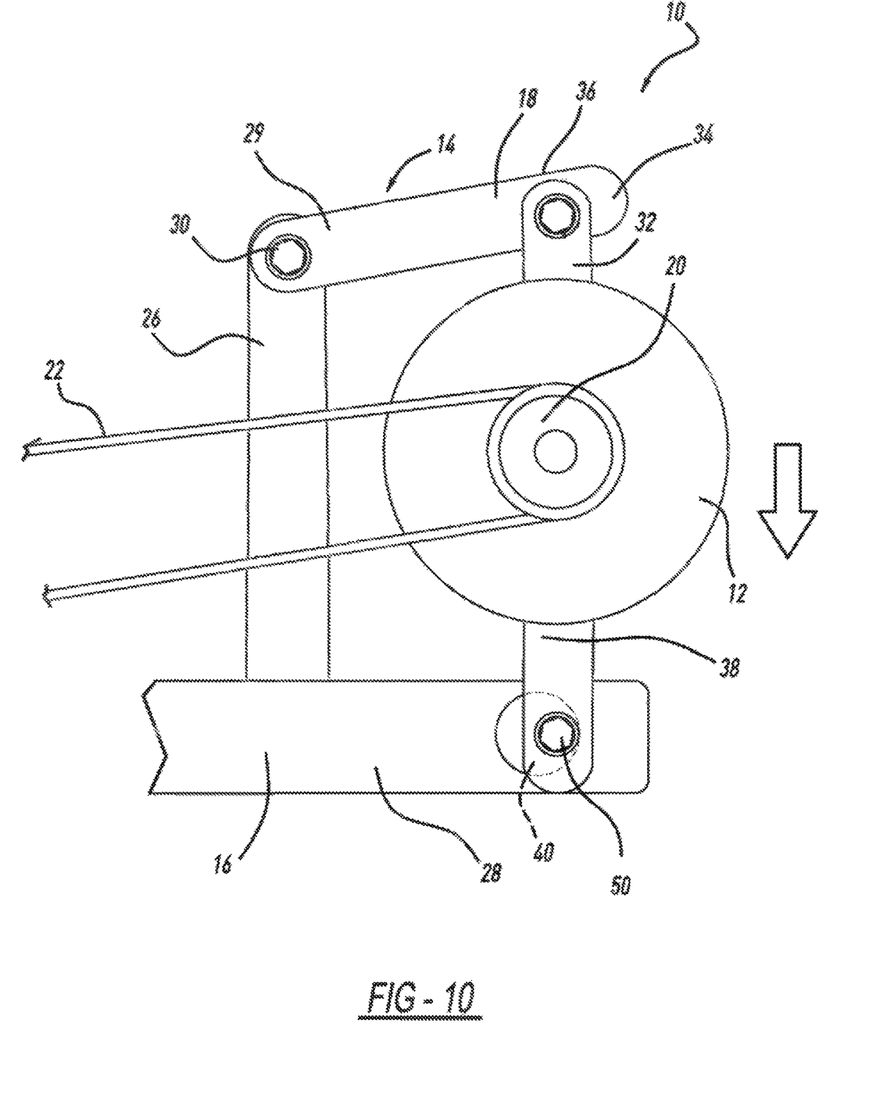
FIG. 10 is a side view of a stretch fit belt bracket assembly according to the disclosed inventive concept wherein the driven unit is positioned in its "final" position to create belt tension.

Once in the position illustrated in FIG. 10, the installer applies a conventional tool such as a socket wrench to the attachment fastener 30 to thereby lock the movable bracket 18 against movement relative to the fixed support bracket 26 and also applies a conventional tool (preferably the same socket of the socket wrench) to the attachment fastener 36 to thereby lock the first accessory arm 32 against movement relative to both the movable bracket 18 and the driven unit 12. The installer also applies a conventional tool (preferably but not necessarily the same socket wrench used to tighten the attachment fastener 30 and the attachment fastener 36) to the threaded fastener 50 to thereby lock the rotatable cylinder body 46 against rotation and the associated movable arm 38 against movement. With the attachment fasteners 30 and 36 and the threaded fastener 50 tightened, the stretch fit belt bracket assembly 10 will maintain tension on the stretch fit drive belt 22 for proper FEAD system operation.

The stretch fit belt bracket assembly 10 of the disclosed inventive concept offers several advantages over known FEAD systems that utilize a stretch fit belt. The stretch fit belt bracket assembly 10 avoids the need for special tooling for installation or removal and further avoids the need for a special service procedure. Not only does this advantage greatly aid the repair technician, it also helps on the production line where no specific installation equipment is required. In addition, because the adjustment elements that allow for easy and reliable belt installation and removal are integral with the stretch fit belt bracket assembly 10, no tool other than, for example, the most basic socket wrench needs to be used when service is required. It is to be understood that while the stretch fit belt bracket assembly 10 is characterized herein as finding use with an automotive vehicle, the same assembly may be used in any situation where a low modulus or stretch fit belt is used including, without limitation, agricultural, marine and industrial settings.

One skilled in the art will readily recognize from the above discussion, and from the accompanying drawings and claims, that various changes, modifications and variations can be made therein without departing from the true spirit and fair scope of the invention as defined by the following claims.

What is claimed is:

1. A stretch fit belt bracket assembly for use with a low modulus drive belt, the assembly comprising:
    a driven accessory;
    a fixed bracket;
    a movable bracket rotatably attached to said fixed bracket;
    a rotatable adjustment assembly having a rotatable cylinder body with an offset threaded hole formed therein, said rotatable adjustment assembly being rotatably attached to said fixed bracket;
    a stop pin fitted between said fixed bracket and said rotatable adjustment assembly;
    an accessory arm connecting said movable bracket to said driven accessory; and
    a movable arm connecting said rotatable adjustment assembly and said driven accessory.

2. The stretch fit belt bracket assembly of claim 1 wherein said accessory arm has a first end movably attached to said movable bracket and a second end fixedly attached to said driven accessory.

3. The stretch fit belt bracket assembly of claim 1 wherein said stop pin is attached to said fixed bracket.

4. The stretch fit belt bracket assembly of claim 3 wherein said rotatable adjustment assembly includes a stop pin channel formed therein, a portion of said stop pin being positioned in said stop pin channel.

5. The stretch fit belt bracket assembly of claim 4, further including a threaded plug removably positioned in said fixed bracket for retaining said stop pin.

6. The stretch fit belt bracket assembly of claim 5 wherein said movable arm includes an aperture and a threaded fastener, said threaded fastener passing through said bore in said movable arm and said threaded hole in said rotatable adjustment assembly.

7. The stretch fit belt bracket assembly of claim 1 wherein said rotatable adjustment assembly includes a flange having an inner side and an outer side.

8. The stretch fit belt bracket assembly of claim 7, wherein said rotatable cylinder body is attached to said inner side of said flange.

9. The pulley bracket assembly of claim 8, further including a tool fitting formed on said outer side of said flange.

10. The stretch fit belt bracket assembly of claim 1 including fasteners for fixedly attaching said movable bracket to said fixed bracket and to said accessory arm.

11. A stretch fit belt bracket assembly for use with a low modulus drive belt, the assembly comprising:
    a driven accessory;
    a fixed bracket;
    a movable bracket rotatably attached to said fixed bracket;
    a rotatable adjustment assembly having a rotatable cylinder body with an offset threaded hole formed therein, said rotatable adjustment assembly being rotatably attached to said fixed bracket;
    an accessory arm connecting said movable bracket to said driven accessory; and
    a movable arm connecting said offset threaded hole and said driven accessory.

12. The stretch fit belt bracket assembly of claim 11 wherein said accessory arm has a first end movably attached to said movable bracket and a second end fixedly attached to said driven accessory.

13. The stretch fit belt bracket assembly of claim 11 further including a stop pin for restricting rotation of said rotatable adjustment assembly.

14. The stretch fit belt bracket assembly of claim 11 wherein said stop pin is attached to said fixed bracket.

15. The stretch fit belt bracket assembly of claim 14 wherein said rotatable adjustment assembly includes a stop pin channel formed therein, a portion of said stop pin being positioned in said stop pin channel.

16. The stretch fit belt bracket assembly of claim 11 wherein said offset threaded hole is formed in said rotatable adjustment assembly and a threaded fastener extends therethrough.

17. The stretch fit belt bracket assembly of claim 16 wherein said movable arm includes an aperture formed therein, said threaded fastener being partially fitted within said aperture.

18. The stretch fit belt bracket assembly of claim 11 wherein said rotatable adjustment assembly includes a flange having an inner side and an outer side, said rotatable cylinder body being formed on said inner side, said flange further including a tool fitting formed on said outer side.

19. The stretch fit belt bracket assembly of claim 11 including fasteners for fixedly attaching said movable bracket to said fixed bracket and to said accessory arm.

20. A method for attaching a low modulus drive belt to pulleys, the method comprising:
- forming a pulley bracket assembly comprising a driven accessory, a fixed bracket, a movable bracket, a rotatable adjustment assembly, an accessory arm connecting said movable bracket and said driven accessory and a movable arm connecting said rotatable adjustment assembly and said driven accessory;
- rotating said rotatable adjustment assembly to a belt install position;
- fitting a belt to said driven accessory;
- rotating said rotatable adjustment assembly to a belt-stretching final position; and
- locking said pulley bracket assembly.

* * * * *